Aug. 14, 1945. W. E. FISHER 2,382,044
PRODUCTION OF WATER-FREE ALCOHOL
Filed July 3, 1942
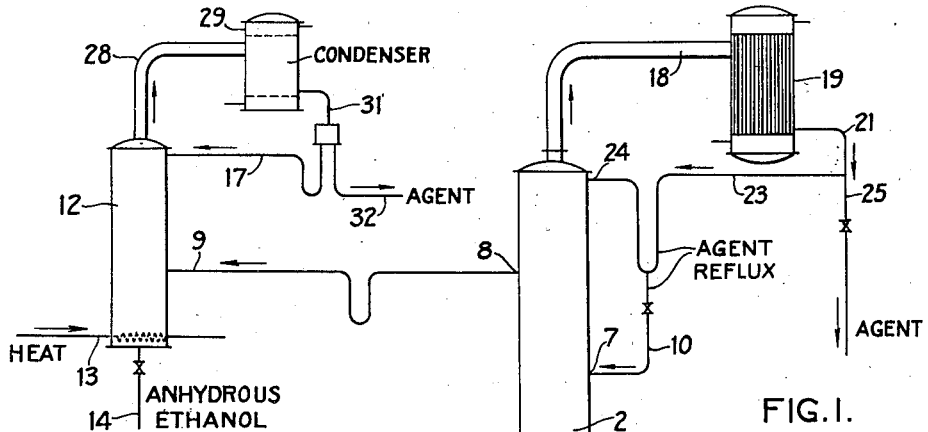
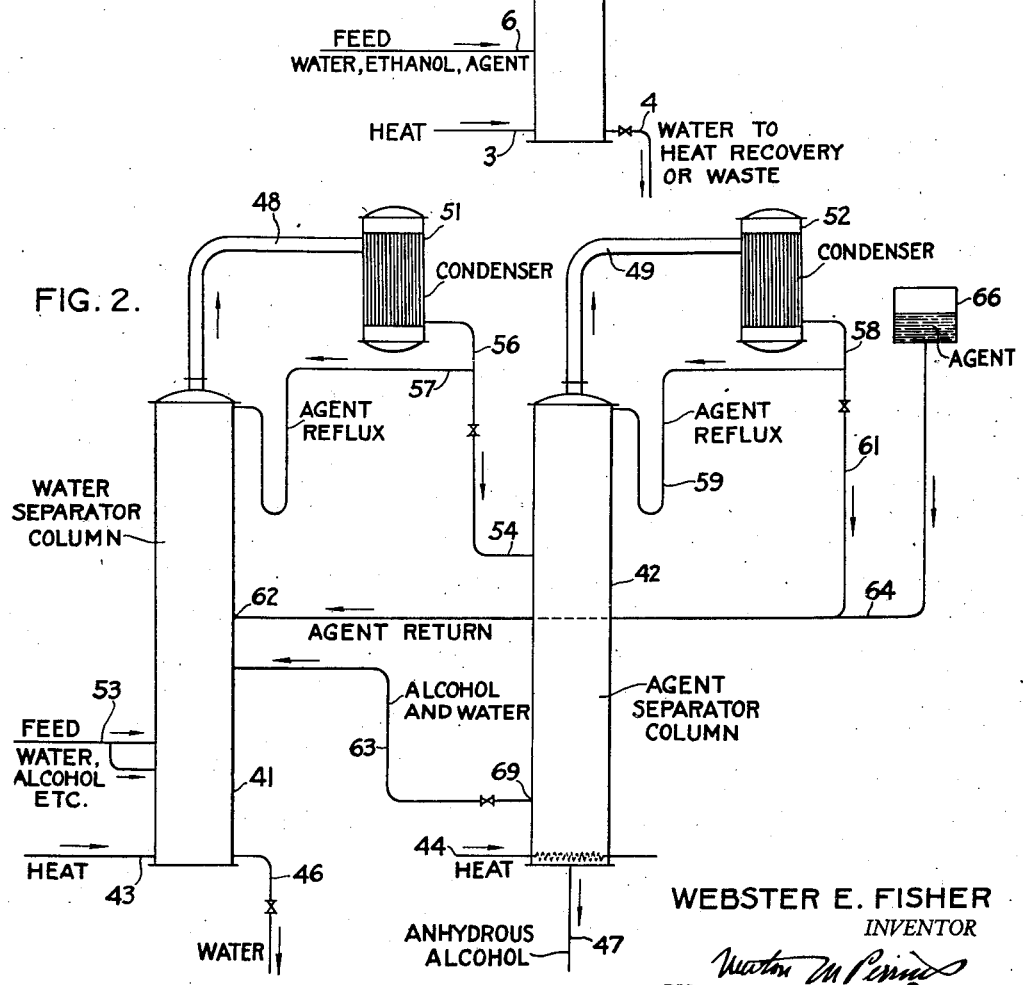
WEBSTER E. FISHER
INVENTOR Patented Aug. 14, 1945

2,382,044

UNITED STATES PATENT OFFICE 2,382,044

PRODUCTION OF WATER-FREE ALCOHOL

Webster E. Fisher, Pine Bluff, Ark., assignor to Eastman Kodak Company, Rochester, N. Y., a corporation of New Jersey Application July 3, 1942, Serial No. 449,614

6 Claims. (Cl. 202—40)

This invention relates to removing water from alcohol and water to obtain an anhydrous or substantially anhydrous product. More particularly this invention relates to the treatment of aqueous sources of ethanol to obtain anhydrous or substantially anhydrous ethanol therefrom.

It has been long known that the complete dehydration of ethyl alcohol presents difficulties. As is well known, a constant boiling mixture exists between ethyl alcohol and water, this mixture boiling at approximately 78° C. and containing approximately 95% by weight of ethyl alcohol. Therefore, while it is possible to dehydrate aqueous ethanol to the aforesaid 95% concentration, further dehydration presents a considerable problem and has been the subject of extensive investigation for a number of years.

While much has been written respecting the dehydration of alcohols and numerous methods have been proposed, some of which methods are used extensively in commercial operations, the methods still leave much to be desired and for some purposes are not particularly suitable. The publication Industrial and Engineering Chemistry, November 1929, contains a description of a number of methods being used in the manufacture of ethyl alcohol. Industrial and Engineering Chemistry, December 1940, discusses absolute alcohol and its manufacture. There are also numerous other writings on the problem of removing water from alcohol and possible methods of so doing such as the publication Distillation, by Joseph Riley, London, 1936.

In general it appears that probably one of the most prevalent methods of removing water from ethyl alcohol would be by distillation involving the addition of a third component which forms or permits the formation of an azeotrope. Apparently hydrocarbons, exemplified by benzene or halogenated hydrocarbons, are the most widely used third components and their use is described in the aforesaid publications. These third materials heretofore employed in the prior art have been substantially insoluble or immiscible (or only partially miscible) with water and, hence, form a constant boiling mixture with water. In most cases it also appears that these third materials form a ternary constant boiling mixture with water and ethyl alcohol. Consequently, in general, a ternary mixture has been removed, leaving the residue of anhydrous alcohol. However, the separation of such ternary mixtures involves rather intricate procedure. Also, due to the relatively low efficiency of removing such an azeotrope, a substantial amount of distillation is required.

It has also been proposed to remove water from alcohol by the addition of solids such as various salts which take up water. However, such procedure has very limited application and is usually useful only on a small scale.

It has also been proposed to carry out distillation in the presence of inert gas. However, under such conditions the condensation of the resulting distillate vapors requires the use of refrigeration and otherwise possesses certain disadvantages.

In addition to the foregoing factors there are other factors which have developed such as, for example, the requirements respecting the denaturing of alcohol, that render prior methods inconvenient. It is, therefore, apparent that the development of a process which not only permits the accomplishment of dehydration as desired, but also permits obtaining the anhydrous alcohol in a denatured condition, is advantageous. Therefore, it is believed apparent from the foregoing that the production of anhydrous or substantially anhydrous alcohol still presents numerous problems and the development of improved and advantageous procedure is a highly desirable result.

This invention has for one object to provide a method for dehydrating ethyl alcohol which is simpler, more efficient, and embodies the use of addition agents considerably different than those heretofore employed in the art. Another object is to provide a method of dehydrating aqueous ethyl alcohol so that the alcohol may be obtained not only in an anhydrous form, but also in the presence of a denaturant or in a condition which does not interfere with the incorporation of various denaturants. Other objects will appear hereinafter.

After extensive investigation I have found that contrary to the principles indicated in the prior art respecting the use of immiscible and insoluble types of addition agent, the azeotrope existing between water and ethanol may be rendered ineffective by the addition of water soluble compounds which will be described in detail hereinafter. That is, rather than incorporate a third material which forms still another azeotrope, namely, a ternary azeotrope, it is possible by my novel procedure to render the initial binary constant boiling mixture ineffective, as will be described, thereby permitting easy separation.

While my process involves the addition of a third component, it is radically different from the prior art in that the requirement of my third components are that they should form no constant boiling mixtures with ethyl alcohol or water and no ternary azeotropes. Usually such components would be completely miscible with ethyl alcohol and water. In addition, the boiling point of my third component usually would be such that it is easily condensible with commercially obtainable cooling water at atmospheric pressure. Also my third component would be separable from ethyl alcohol by simple fractional distillation or equally uncomplicated procedure. In addition the third component would be one substantially or completely inert with respect to the alcohol and water.

As will be apparent as the description proceeds, in my process the third component probably functions to reduce the partial distilling pressure of the ethyl alcohol and water constant boiling mixture to such a point that any azeotrope (constant boiling mixture) ceases to exist.

For a further understanding of my invention reference will be made to the attached drawing which forms a part of the present application.

Fig. 1 represents a semi-diagrammatic side elevation view showing one arrangement of apparatus that might be employed for carrying out my process.

Fig. 2 likewise is a semi-diagrammatic side elevation view showing another arrangement of side apparatus which may be employed for carrying out another embodiment of my process. These drawings, as indicated, are semi-diagrammatic and various details, such as heat exchange and the like which have heretofore been employed in alcohol distillation or are employable, likewise may be utilized in the present set-up. It is, therefore, to be understood that my invention contemplates the use of various expedients to save heat and otherwise operate the distillation in a most efficient manner and in accordance with best engineering practice.

Referring to Fig. 1, 2 represents a distillation column or equivalent fractionating device familiar to the art. For example, 2 might comprise a plate column of 30 to 70 plates. The lower part of the column, as at 3, is provided with heating means. The heating means may, for example, either be closed heating coils, or provision for introducing live steam. The lower part of the column would preferably also be provided with an outlet or drainage conduit 4.

Intermediate of the column, as will be discussed hereinafter, would be provided one or more feed inlets 6 for supplying to the column all or a part of the components to be treated.

Also intermediate of the column, as at 7 and 8, other conduits may be attached. Reference is made to a reflux conduit which may be connected at 7 and withdrawal conduit at 8, said withdrawal conduit leading to other processing equipment such as another distillation column 12.

This other distillation column is smaller, but on a similar scale and capacity, than column 2 just described and includes heating means 13, draining means 14, and reflux conduit 17. The conduit 9 comprises the feed conduit to this latter column.

Referring back to the larger and main column 2, the upper portion thereof is provided with a vapor offtake conduit 18 which leads through one or more condensers 19. The condensate conduit 21 leading from the condensers is connected with branch conduit 23 which supplies the reflux line 10 aforementioned or leads back to a higher point in the column as at 24. Also there is a draw-off conduit 25.

Referring to the smaller column 12, likewise this column is provided with a vapor offtake conduit 28, condenser 29, and a plurality of condensate and distribution conduits 31 and 32.

Referring to Fig. 2, while another arrangement of apparatus is shown, it may be constructed out of similar units. That is, there would be provided a plurality of distillation columns 41 and 42, either bubble plate, packed or the like construction, as already described with respect to Fig. 1. These columns are provided with means 43 and 44 for supplying heat to the units. Also suitable means, such as drain conduits 46 and 47 may be provided at the lower part of the unit for permitting the withdrawal of residue from the lower part of the column.

The upper parts of the columns as at 48 and 49 are provided with vapor offtake conduits which lead to condensers 51 and 52 also of the type such as referred to in the preceding description.

Referring to column 41, intermediate thereof as at 53 would be provided one or more inlet conduits for supplying the feed to the column. Likewise with respect to column 42, intermediate thereof would be a feed conduit 54. However, conduit 54 originates from the condensate and reflux conduits 56 and 57 of the first-mentioned column 41.

Referring further to column 42, this column is likewise provided with condensate and reflux conduits 58 and 59. However, in this instance the branch conduit 61 leads back to the first-mentioned column 41 at some intermediate point 62. Also there is provided another conduit 63 connecting the lower part of column 42 with the intermediate part of column 41. At some convenient point, as at 64, would be provided an inlet for supplying agent to the system, the agent being contained in container 66.

As already indicated above, various items such as valves, thermometers, level gauges, heat exchangers, and other parts may be included in the apparatus without departing from my invention. For simplifying considerations these various parts have not been included in the present illustrative drawing. However, in practice it would be preferred to employ automatic controls and the like equipment such as described in companion application 269,193 in which I am one of the inventors.

Referring to certain of the general considerations respecting my process it would be first pointed out that my novel process may be applied in the treatment of any of the aqueous mixtures of ethanol encountered in practice. That is, very dilute mixtures may be treated or the so-called azeotropic mixture, which is the mixture presenting the difficulty of separation, can be treated, the very dilute solutions being first concentrated to the constant boiling mixture.

The aqueous alcoholic solution, whatever its source, would have incorporated therewith, either premixed or added after the mixture has been introduced into the distillation unit, the agent in accordance with my invention, which agent so functions to effectively cause the azeotrope between the water and the alcohol to cease to exist. The mixture is distilled either batch or continuously in the presence of one or more of these agents, as will be described in detail hereinafter, to obtain anhydrous alcohol. It is, of course, apparent that if all the water can be removed various degrees of hydration can be obtained and various concentrations of alcohol beyond the 95% produced, as might be desired.

My invention functions satisfactorily under normal atmospheric pressure; however, if it is desired to go to the expense and trouble of reduced pressure my process may be so carried out. However, for simplicity I would usually operate my process under ordinary existing atmospheric conditions.

The agent which I prefer to add to my process for permitting separation of the ethanol and water azeotrope is methanol (methyl alcohol). An ordinary commercially obtainable product appears to function quite satisfactorily, but a chemically pure grade may be employed if such is desired. Various considerations enter into the choice of any particular source of agent such as whether it is desired to leave a certain amount in for a denaturant or the like factors. It will be observed that methanol is, contrary to procedure and materials heretofore used in dehydrating alcohol, a water soluble rather than insoluble material. Also my agent is easily condensable at atmospheric pressure, thereby permitting its easy separation and reuse in a continuous process.

However, my invention is not limited to the use of this single agent, but I have also found that other water soluble agents, exemplified by acetone, function in a comparable manner and one or more of these agents (such as various mixtures) may be employed. As indicated above, since my addition agents, in contrast with the prior art, form no constant boiling mixtures and are miscible with alcohol and water instead of immiscible, I generically refer to them as "soluble" agents.

For a better understanding of my invention detailed examples will be set forth. However, it is to be understood that these examples are primarily for illustrating the preferred embodiment of my invention and not to be considered an undue limitation thereon.

*Example I*

Fig. 1 represents the equipment which would preferably be used for carrying out the process of this example. In this example my novel methyl alcohol agent was premixed with the feed. That is, the feed mixture comprised approximately 40% methyl alcohol agent, and 10% ethyl alcohol mixed with 50% water fed into the distillation column 2 through conduit 6. In this instance where there was a rather substantial amount of water mixed with the ethanol, the feed would preferably be toward the lower part of the column. Although the components may be fed at any intermediate point in the column, either in the vapor or liquid phase, for preferred operation I would introduce the feed at a plate where the components within the column most closely compare with the components of the feed. That is, it will be kept in mind that at the bottom of the column the liquid within the column will be primarily water whereas at the top of the column the components will be substantially free of or low in water and comprised principally only of alcohols. At intermediate points there would be, of course, variant degrees of quantities of water and alcohol.

Therefore, in the example under consideration, since the mixture treated contains a substantial amount of water I would prefer to feed it at an intermediate plate in the lower portion of the column since, as just pointed out, the feed would be into an environment also containing a substantial amount of water. In the example under consideration low pressure steam may be introduced directly into the base of the column at point 3 since water is to be withdrawn from the base of the column in any event. However, if desired, of course a closed heating coil or other manner of heating may be employed. From the commercial standpoint, however, since low pressure steam may be readily available my process lends itself to ready adaptation to commercial conditions by virtue of the ability of being able to utilize low pressure steam directly introduced.

It will be observed in connection with this feature of introducing low pressure steam that in prior art processes, since the alcohol in many instances is removable only from the base of the column it would be impossible to employ the direct introduction of steam because the alcohol would immediately become hydrated. In my process, by means of steam passing up the column, the alcohols are stripped from the water and fractionated upwardly so that the liquid discharged from the lower part of the column at 4 consists essentially of water which may be passed to waste.

Passing upwardly through column 2 from the base, the water content will be continuously decreased. Normally the limit of water-alcohol (with respect to ethanol) would be the constant boiling mixture containing approximately 95.5% ethyl alcohol. Because of the presence, however, of my novel methanol agent in the mixture the partial distilling pressure of the ethanol-water is reduced to such a point that this azeotrope no longer exists and at a point indicated, for example at 8, there will prevail a substantially anhydrous mixture of methanol and the ethyl alcohol being recovered. It is, of course, understood that if completely anhydrous ethyl alcohol is not desired various degrees of hydration can be obtained by making the point of withdrawal at a lower point where there is still water.

Since ethyl alcohol is more volatile than water it, of course, tends to fractionate up from the bottom. Ethyl alcohol is, however, considerably less volatile than my methanol agent and will, therefore, tend to fractionate down from the top of the column, hence, will be found at a maximum concentration at a point 8 as indicated where, in accordance with my preferred procedure of this example I would withdraw an anhydrous mixture of methanol agent and the ethyl alcohol.

If completely denatured ethanol is desired a part of the methanol agent may be permitted to remain in the ethyl alcohol. On the other hand, if only a partially denatured ethanol is desired this anhydrous mixture withdrawn at 8 may be conducted to column 12 where it is subjected to simple fractional distillation to separate the methanol agent from the ethyl alcohol.

That is, from the top of column 12 to conduit 28 there may be obtained a distillate comprising essentially methanol agent substantially free of the recovered ethyl alcohol. This distillate may be condensed in condenser 29 and a portion thereof conducted through conduits 31 and 17 back to column 12 for reflux, the remainder being withdrawn through conduit 32 for reuse in further processing of ethyl alcohol to be dehydrated.

Referring to the upper portion of column 2, there will be obtained through offtake conduit 18 a distillate essentially comprised of methyl alcohol which would be condensed in condenser 19, a portion thereof being returned to column 2 as reflux through conduits 21, 23, 24, and 10 and the remainder being withdrawn through conduit 25 for reuse in further processing of alcohol to be dehydrated.

In some instances it may be desirable to return or even supply additional methanol agent to an intermediate section of the column as through conduit 7, the function of which addition and column section is to destroy the azeotrope between ethyl alcohol and water which may exist in this section.

That is, in operation of my process, for example, a portion of the methanol agent could be supplied with the feed and another portion be introduced at or about at the point of introduction of conduit 10 so as to maintain a rather substantial concentration of methanol agent in the middle of the column. The presence of some methanol agent in the ethyl alcohol at all times as a denaturant is desirable due to the requirements respecting that ethanol should be denatured. It is, therefore, apparent that my process is advantageous over the prior art processes wherein, after dehydration by prior art methods, the alcohol was obtained as such and required the separate mixing of denaturants therewith. This not only involves extra operation, but in view of governmental regulations respecting denaturing ethanol, introduces additional factors for consideration.

Example II

In operating this example reference is made to Fig. 2. In accordance with the procedure of this example the feed containing aqueous ethyl alcohol to be dehydrated would be supplied to column 41 through conduit 53. The feed may comprise any mixture of ethyl alcohol and water containing anywhere from a mere trace to substantially 100% ethyl alcohol. Likewise, as already discussed, the intermediate point in column 41 where it would be preferred to introduce the feed would be chosen dependent on the particular composition of the feed. That is, if the mixture was relatively high in alcohol it would be fed toward the upper part of the column, whereas if it contained a large amount of water the point of feed would preferably be somewhere in the lower part of the column.

Part or all of the agent may be introduced with the feed or into the column at some point such as at 62. In this particular example the agent employed was acetone.

Heat was supplied to the lower part of the column at 43 and the waste water separated withdrawn at 46. Due to the heating, as already discussed, the ethanol tends to fractionate upwardly in the column and the water down so that at some point in column 41, near 62, the ethanol will have obtained a concentration of approximately 95%, namely, the constant boiling mixture.

Hence, at this point 62 I have found that it would be desirable to introduce some of the agent, as for example, supplied from conduit 64 which is connected with the agent container 66.

The agent, namely in this example acetone, being the most volatile component present, passes upwardly through the column so that the partial distillation pressure of the alcohol and water mixture is reduced to such a point that the azeotrope (constant boiling mixture) may be considered as effectually eliminated. That is, the proportion of water with respect to the ethyl alcohol decreases to substantially zero at the top of column 41.

From the top of column 41, therefore, is distilled an anhydrous mixture containing acetone and ethyl alcohol free of water. It is of course understood that if it is not desired to remove all of the water the components may be withdrawn at a lower point, or shorter columns may be employed or other expedient adopted for permitting a part of the water to remain. Inasmuch as the problem is to remove all the water it is apparent that the retention of a part of the water would present no great difficulty.

The aforementioned mixture of acetone agent and ethyl alcohol is condensed in condenser 51 and withdrawn through conduit 56. A portion of this condensate is returned through conduit 57 as reflux and the remainder is withdrawn through conduit 54 into the second column, namely, column 42.

As already discussed, the feed through conduit 54 to the second column would preferably be introduced at some intermediate point, namely, at a plate where the contents of the column at that plate most closely resembled the composition of the material being supplied through conduit 54. In column 42 at the upper portion of the column there would be substantially all agent, namely, acetone in the instant example. At the bottom of the column there would be substantially all anhydrous ethanol (containing agent if desired) depending upon whether an entirely pure alcohol would be obtained or a denatured alcohol. At points between the top and bottom there would be composition containing varying amounts of agent and alcohol. As indicated, the choice of where the conduit would be connected would depend upon the particular mixture in feed conduit 54. However, it is possible to attach it to any intermediate plate with entirely operative results.

Referring to column 42, this column operates as a fractionating column in which acetone agent substantially free of ethanol is fractionated from the top of the column through conduit 49 and condensed in condenser 52. The condensate is conducted through conduit 58 and divided, a part of which is returned as reflux to the column through conduit 59, the remainder conducted through conduit 61 to be introduced into the first column at point 62, as already discussed. For convenience additional agent may be introduced at point 64 for making up any losses or increasing the amount of agent due to a change in the feed or other changed conditions.

In general from the lower part of column 42, as at 47, there would be removed the desired anhydrous ethyl alcohol. In this column a closed heating unit, indicated at 44, would be employed rather than the introduction of direct steam which would dilute the alcohol.

Referring again to the first column, namely, column 41, although the mixture distilled from this column and fed through conduit 54 into column 42 usually consists of only an anhydrous mixture of acetone agent (or other agent) and ethyl alcohol, any amount of water which might be present in this mixture would tend to form an azeotrope with an ethyl alcohol near the base of column 42. On the other hand, this water being less volatile than my novel agents will tend to fractionate down column 42 and, hence, will accumulate at some point near the lower part of column 42 designated 69, from which a small continuous stream of either liquid or vapor may be withdrawn. Eventually this withdrawn material may be fed back to column 41 as through conduit 63, thereby keeping alcohol losses to a minimum.

In the immediately preceding example, while I have described the use of a ketone, namely, acetone as the soluble agent which renders ineffective the ethanol-water azeotrope, it is of course apparent that the methanol agent of Example I could be employed in a comparable manner. Or a mixture of these components may be employed, as for example, for obtaining concurrent dehydration and denaturing. While for simplicity, as well as obtaining pure or unmixed products I would prefer to employ the agent in a relatively pure, uncontaminated condition, I have found that a commercially obtainable "soluble" agent in accordance with the present invention and exemplified by methanol, acetone, and the like, functions very satisfactorily in my process.

While the foregoing examples represent preferred procedures and operate very satisfactorily under normal atmospheric conditions my process may be operated in either a batch or continuous manner and have applied thereto reduced pressure if desired. The various conduits and refluxes may be passed through the condensers or in heat exchange with the outgoing products from the base of the various columns. Also, if desired, preliminary heaters may be supplied for supplying the feed components in a heated or vaporous condition and various other changes made without departing from the spirit of my invention.

It is believed apparent from the foregoing examples that my process, involving the use of a soluble, miscible agent, differs rather substantially from the prior art processes involving the use of benzene and other water insoluble and immiscible compounds which, rather than rendering ethanol-water azeotrope ineffectual, actually cause the formation of still further azeotropes.

In the operation of my process varying amounts of the agent may be present, dependent upon factors above discussed, such as whether it is desired to retain a portion of the agent in a fully dehydrated or partially dehydrated alcohol as a denaturant. In general, however, I have found that very satisfactory results are obtained by having the agent comprise approximately 30% to 50% of the total mixture. That is, referring to the feed through conduit 6 of Fig. 1, in 100 parts of feed there would preferably be 30 to 50 parts of the agent, assuming that all of the agent were being supplied to the feed. Of course, if agent were being incorporated at other points in the system the amount in the feed would be lower. However, larger or smaller amounts than that indicated may be employed, depending on the agent employed, the degree of dehydration desired, whether agent is to be retained in the processed ethanol, and other factors. In general, however, I would prefer to have a quantity of agent, at least approximately equal to or greater than the quantity of ethanol in the system. In general, however, I would introduce into the system (either batch or continuous) a quantity of agent at least approximately as large as the quantity of ethanol, as exemplified by the above example where the 40% methanol agent was employed along with approximately 10% ethanol.

It is believed that my novel process, as described herein, represents a substantial advance in the problem of removing water from aqueous ethanol solutions and providing simpler and less complicated procedure wherein the ethanol may be, if desired, obtained in a denatured condition. That is, the alcohol can be obtained in a denatured condition without the necessity of separating one agent and then incorporating the denaturant since the methanol agent of my invention in itself can be considered as functioning as a denaturant. Various other advantages possessed by my process will be apparent from the foregoing and the claims.

What I claim and desire to be secured by Letters Patent of the United States is:

1. In a process of obtaining dehydrated ethanol, the improvement step which comprises distilling an aqueous solution of ethanol in a rectification column in the presence, as the third component, of an amount of an agent selected from the group consisting of methanol and acetone, sufficient to produce an agent-ethanol composition essentially free of water at the top of the column and withdrawing ethanol-agent mixture from the column at a point where the water-ethanol ratio is less than azeotropic proportion.

2. In a process of obtaining dehydrated ethanol, the improvement step which comprises distilling an aqueous solution of ethanol in a rectification column in the presence, as the third component, of an amount of methanol sufficient to produce a methanol-ethanol composition essentially free of water at the top of the column, and withdrawing ethanol-methanol mixture from the column at a point where the water-ethanol ratio is less than azeotropic proportion.

3. In a process of obtaining dehydrated ethanol, the improvement step which comprises distilling an aqueous solution of ethanol in a rectification column in the presence, as the third component, of an amount of acetone sufficient to produce an acetone-ethanol composition essentially free of water at the top of the column, and withdrawing ethanol-acetone mixture from the column at a point where the water-ethanol ratio is less than azeotropic proportion.

4. In a process of obtaining dehydrated ethanol, the improvement step which comprises distilling an aqueous solution of ethanol in a rectification column in the presence, as the third component, of an amount of an agent selected from the group consisting of methanol and acetone sufficient to produce an agent-ethanol composition essentially free of water at the top of the column, in which an aqueous alcohol to be dehydrated is introduced to the rectification column at a point where the composition of the aqueous alcohol within the column approximately corresponds to the composition of the aqueous feed and withdrawing ethanol-agent mixture from the column at a point where the water-ethanol ratio is less than azeotropic proportion.

5. A method of obtaining a dehydrated ethanol from aqueous solutions thereof which comprises feeding said aqueous solutions to a rectification column containing ethanol, water and an agent selected from the group consisting of methanol and acetone present in an amount sufficient to produce an agent-ethanol composition essentially free of water at the top of the column, applying heat to the column for causing fractionation, withdrawing anhydrous vapors of ethanol-agent at a point in the column where the water-ethanol ratio is less than azeotropic proportion, withdrawing agent at a still higher point in the column and condensing and returning a part of the condensed agent to the column as reflux.

6. A method of obtaining dehydrated ethanol from an aqueous solution thereof which comprises feeding said aqueous solution to a rectification column, containing ethanol, water, and methanol, the latter in an amount sufficient to produce a methanol-ethanol composition essentially free of water at the top of the column, at a point where the composition of the aqueous alcohol within the column approximately corresponds to the composition of the aqueous feed, applying heat to the unit for causing fractionation, withdrawing anhydrous vapors of ethanol and methanol at a point in the column substantially free of water vapor, withdrawing methanol vapors at a still higher point in the column and condensing and returning a part of the condensed methanol to the column as reflux.

WEBSTER E. FISHER.